United States Patent [19]

Luria

[11] 4,138,973

[45] Feb. 13, 1979

[54] PISTON-TYPE INTERNAL COMBUSTION ENGINE

[76] Inventor: David Luria, University St. 81B, Tel Aviv, Israel

[21] Appl. No.: 795,433

[22] Filed: May 10, 1977

Related U.S. Application Data

[62] Division of Ser. No. 585,652, Jun. 10, 1975, Pat. No. 4,033,304.

[30] Foreign Application Priority Data

Jun. 14, 1974 [IL] Israel .......................... 45039

[51] Int. Cl.² ...................... F02B 75/04; F02D 13/00
[52] U.S. Cl. ........................... 123/78 B; 123/75 E; 123/90.16; 123/112
[58] Field of Search ............... 123/48 B, 78 B, 90.15, 123/90.16, 105, 109, 112, 115, 75 E

[56] References Cited

U.S. PATENT DOCUMENTS

| | | | |
|---|---|---|---|
| 1,033,760 | 7/1912 | Hutchinson | 123/78 B |
| 1,307,185 | 6/1919 | Claudel | 123/75 E |
| 1,402,393 | 1/1922 | Bolan | 123/78 B |
| 1,497,206 | 6/1924 | Bouton | 123/75 E |
| 1,521,854 | 1/1925 | Barthel | 123/78 B |
| 1,623,589 | 4/1927 | Granath | 123/75 E |
| 1,819,897 | 8/1931 | Johnson | 123/75 E |
| 2,250,814 | 7/1941 | Rohlin | 123/90.16 |
| 2,880,712 | 4/1959 | Roan | 123/90.16 |
| 2,887,993 | 5/1959 | Shallenberg | 123/75 E |
| 3,413,965 | 12/1968 | Gravasso | 123/90.16 |

*Primary Examiner*—Ronald H. Lazarus
*Assistant Examiner*—David D. Reynolds
*Attorney, Agent, or Firm*—Benjamin J. Barish

[57] ABSTRACT

A piston-type internal combustion engine is described including a variable valve timing device controlling the timing of the intake valve, a coupling between the accelerator pedal and the variable timing device for varying the timing of the intake valve in response to the movement of the accelerator pedal, and means for maintaining a substantially constant compression ratio in the cylinder notwithstanding variations in the engine output. The latter means comprises a floating piston crown which is permitted to move further inwardly into the cylinder at the end of the compression stroke when the delay in closing the intake-valve is increased, than when the delay is decreased.

4 Claims, 9 Drawing Figures

| STROKE | EXPANSION | EXHAUST | INDUCTION | COMPRESSION |
|---|---|---|---|---|
| CRANK ANGLE (deg) | 180 | 360 | 540 | 720 |
| HIGH OUTPUT |  |  |  |  |
| INTAKE VALVE OPENING | — | — | 360–540 | — |
| LOW OUTPUT |  |  |  |  |
| INTAKE VALVE OPENING | — | — | 360–540 | 540–640 |

PISTON-TYPE INTERNAL COMBUSTION ENGINE

RELATED APPLICATIONS

The present application is a division of my U.S. Patent application 585,652 filed June 10, 1975 now U.S. Pat. No. 4,033,304 of July 15, 1977.

BACKGROUND OF THE INVENTION

The present invention relates to internal combustion engines, and particularly to the piston-type internal combustion engine including a cylinder and a piston movable therein through induction, compression, expansion and exhaust strokes.

Commonly used today in automobiles is the conventional four-stroke Otto-cycle engine, the engine output usually being varied by means of a throttle which controls the amount of fuel mixture inducted into the engine. One drawback of such an engine is that the Otto-cycle, in which the induction and compression strokes are equal to the expansion and exhaust strokes, does not enable as complete combustion and exhaust of the combustion gases, as, for example, the Atkinson-cycle engine. The latter uses longer strokes for expansion and exhaust than for induction and compression, and thereby obtains more complete expansion and exhaust. The Otto-cycle engine is therefore not as efficient as the Atkinson-cycle engine. Another disadvantage of the conventional Otto-cycle engine is that the throttle, when partially or completely closed to lower the engine output, causes pumping losses and thereby further reduces engine efficiency. A further disadvantage is that the incomplete combustion of the fuel causes serious air-pollution problems.

SUMMARY OF THE INVENTION

An object of the present invention is to provide an internal combustion engine having improved performance characteristics in the above respects.

According to the invention of the present application, there is provided a variable valve timing device controlling the timing of the intake-valve, and a coupling between the engine output control member (e.g. accelerator pedal) and the variable timing device for varying the timing of the intake-valve in response to the movement of the engine output control member, thereby controlling the quantity of the fuel-air mixture in the cylinder at the time of combustion. The engine also includes an arrangement for maintaining a substantially constant compression ratio in the cylinder notwithstanding variations in the engine output, the latter means including a floating crown on the piston, a skirt coupled to the piston pin, and a spring connected at one end to the piston pin (directly, or indirectly via its skirt), and at the opposite end to the piston crown.

The lowering of the gas pressure acting on the floating crown upon an increase in the delay of the closing of the intake valve, permits the crown, by virtue of the inertia forces acting on it, to move further inwardly into the cylinder at the end of the compression stroke than when the delay is decreased. The further inward movement of the crown is directly proportional to the reduction of the original compression stroke resulting from the delay in the closing of the intake valve, thereby causing the engine operation to approximate a substantially constant compression ratio operation notwithstanding variations in the valve closing delay and variations in the engine output. In addition, the spring acts to move the crown further inwardly into the cylinder at the end of a compression stroke, and to a greater extent at the end of the exhaust stroke, thereby maximising the exhaust of the spent gases and the quantity of the fuel-air mixture that may be inducted.

Further features and advantages of the invention will be apparent from the description below.

BRIEF DESCRIPTION OF THE DRAWINGS

The invention is herein described, for purposes of example only, with reference to the accompanying drawings, wherein.

DESCRIPTION OF THE PREFERRED EMBODIMENT

Figure 7:
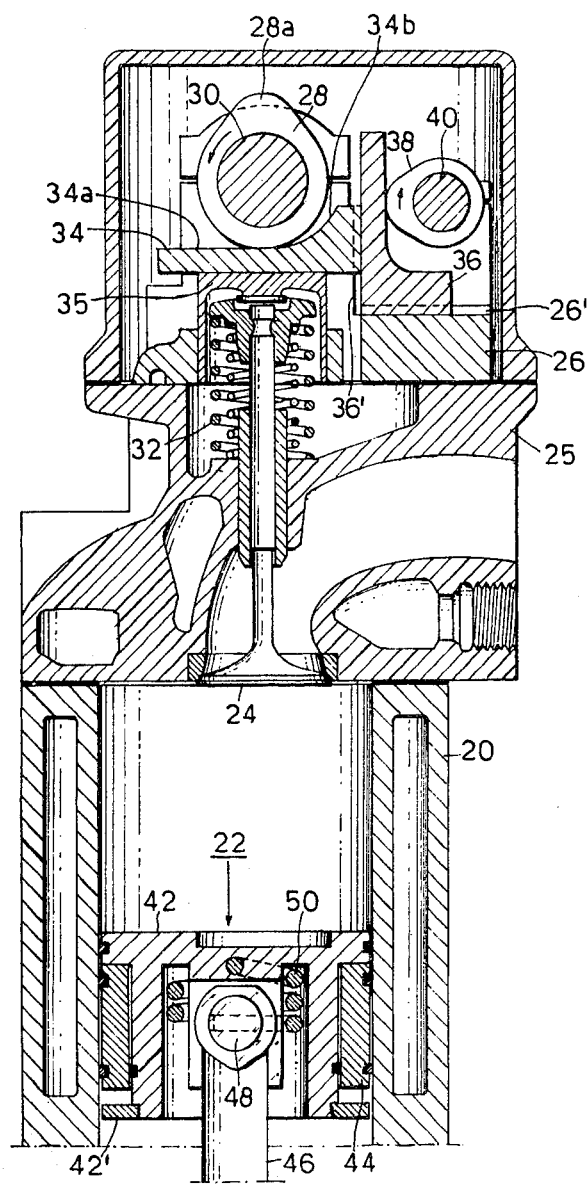
FIG. 7 is a transverse sectional view illustrating an "Otto-Atkinson" engine constructed in accordance with the invention.

Before describing the preferred embodiment of the invention illustrated in FIG. 7, it will be helpful in understanding the invention to first discuss some thermodynamic considerations on which the invention is based.

Figure 1:
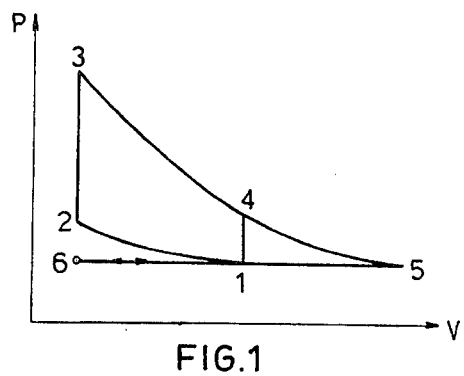
FIG. 1 is a pressure-volume diagram illustrating both the ideal Otto and Atkinson cycles.

FIG. 1 illustrates the ideal Otto and Atkinson cycles, the Otto cycle including the path 6-1-2-3-4-1-6, and the Atkinson cycle including the path 6-1-2-3-4-5-6. As known, in the Atkinson cycle the expansion and the exhaust strokes are both longer than the induction and compression strokes, which produces a more complete expansion, and therefore a more efficient operation, than in the ideal Otto cycle.

In both the Otto-cycle and Atkinson-cycle engines, an increase in the compression ratio increases the ideal thermal efficiency of the engine. This is shown by curves A and B, respectively, in FIG. 2.

Figure 3:
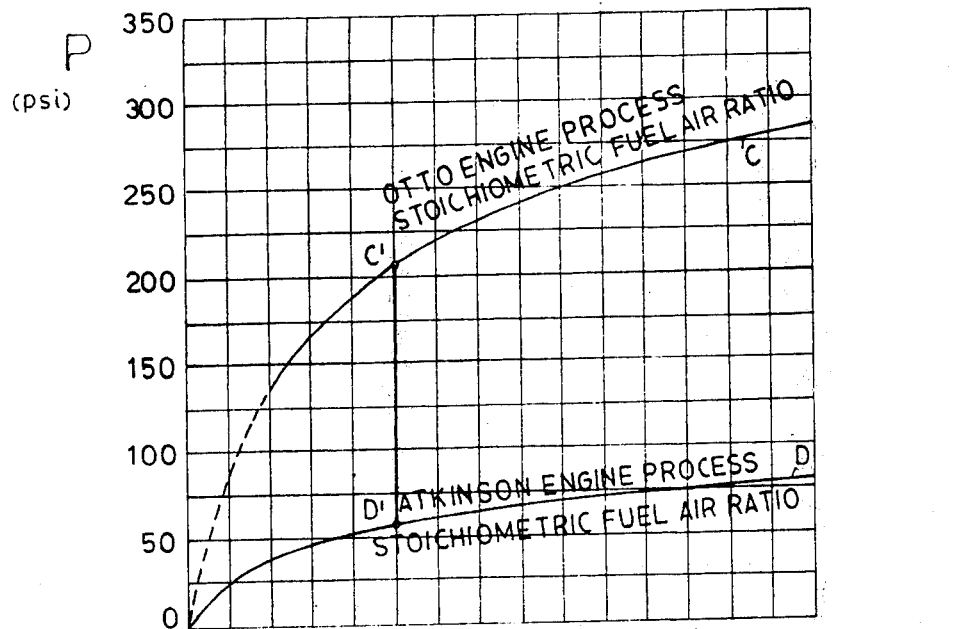

As will be noted from FIG. 3, the ideal mean effective pressure (IMEP) also varies with the compression ratio in both the Otto-cycle and Atkinson-cycle engines, this being shown by curves C and D, respectively. The Atkinson-cycle engine, since it involves a longer expansion stroke as compared to the Otto-cycle engine, results in a very low IMEP value.

Figure 4:
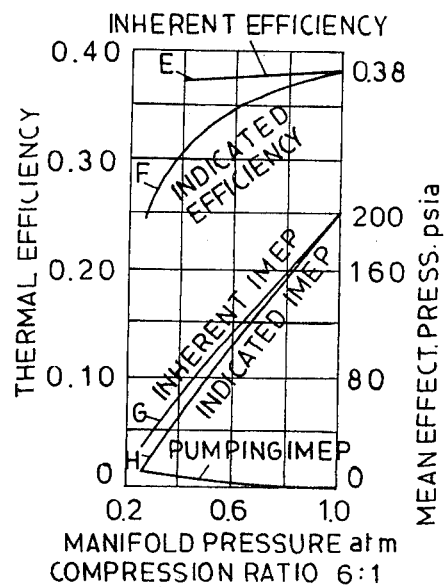
FIG. 4 illustrates how the thermal efficiency is affected by throttling an Otto-cycle engine.

FIG. 4 illustrates the affect of throttling on the ideal Otto-cycle engine, this figure showing the condition at a compression ratio of 6:1. Thus, when the manifold pressure is 1.0 atm (i.e. a fully open throttle to produce maximum engine output), the inherent efficiency of the engine is about 38% as shown by curve E; and as the throttle is closed, this inherent efficiency decreases. The indicated efficiency, shown by curve F, decreases even faster, so that when the manifold pressure is approximately 0.3 atm, the indicated efficiency drops because of the pumping work required when the throttle is almost closed.

Curves G and H in FIG. 4 illustrate how the inherent IMEP and the indicated IMEP, respectively, vary with variations in the manifold pressure caused by throttling the engine. It will be seen that these decrease rapidly from a mean effective pressure of about 200 psia at fully open throttle (1 atm) to about 40 psia at a manifold pressure of 0.3 atm (compression ratio = 6:1).

In the present invention, the engine output is not varied by a throttle, but rather by controlling the timing of the intake valve in response to the movement of the engine output control member (e.g. automobile accelerator pedal) to control the quantity of the charge inducted into the engine. In the described embodiment, this is effected by providing a variable timing device coupled to the engine-output control member to effect a delay in the closing of the intake valve after the start of the compression stroke, such delay being increased when the control member is moved to lower the engine output, and being decreased when the control member is moved to raise the engine output. Thus, the greater the delay in the time of closing of the intake valve, the greater will be the quantity of the mixture which will be forced back into the intake manifold, and therefore the smaller will be the charge actually inducted into the cylinder at the time of the actual closing of the valve. The smaller charge will therefore produce a lower engine output.

According to a further feature of the invention, the engine operation approximates a substantially constant compression ratio operation notwithstanding the variations in the delay of closing the intake valve. This is effected by providing the piston with a floating crown such that the lowering of the gas pressure acting thereon upon an increase in the delay of closing the intake valve permits the crown, by virtue of the inertia force acting on it, to move further inwardly into the cylinder at the end of the compression stroke than when the delay is decreased. In the preferred embodiment described below, the crown is floated by means of a spring, and therefore a spring force acts with the inertia force to move the crown further inwardly into the cylinder at the end of the compression stroke.

Figure 2:
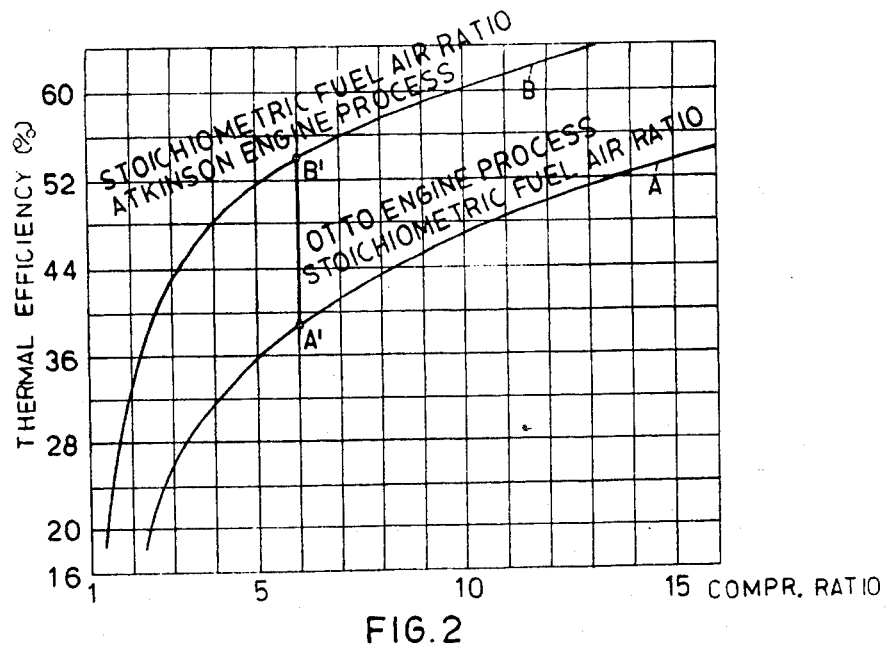
FIGS. 2 and 3 are diagrams illustrating respectively, how the indicated thermal efficiency and the mean effective pressure vary with the compression ratio in both the Otto-cycle and the Atkinson-cycle engines.

Thus, the operation of the Otto-Atkinson engine illustrated in FIG. 7 as a preferred embodiment of the invention approximates the constant compression ratio line A'-B' of FIG. 2, and C'-D' of FIG. 3, these lines illustrating the operation at a compression ratio of 6:1 for reducing the engine output. Point A' corresponds to the maximum load achieved by Otto-Atkinson cycle with minimum thermal efficiency (pure Otto cycle), whereas B' corresponds to the point of maximum thermal efficiency (pure Atkinson cycle) for reduced load without over-expansion.

Figure 5:
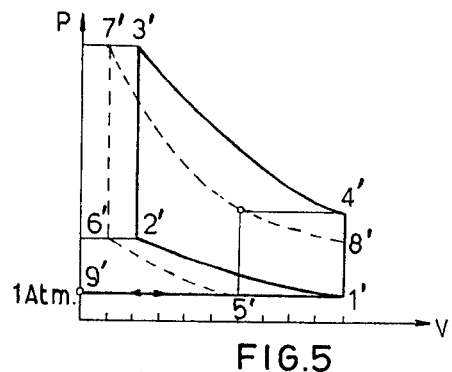
FIG. 5 is a volume-pressure diagram illustrating the operation of an "Otto-Atkinson" engine constructed in accordance with the present invention.

FIG. 5 illustrates the volume-pressure relationship to the "Otto-Atkinson" engine described below as the preferred embodiment of the invention. The volume-pressure relationship in such an engine varies according to the output of the engine. When operating at maximum output, the V-P relationship is illustrated by the full line path 9'-1'-2'-3'-4'-1'-9'; and when operating at minimum engine output, this relationship is illustrated by the broken line path 9'-1'-5'-6'-7'-8'-1'-9'. The compression ratio at maximum load (V1:V2) equals the compression ratio at minimum load (V5:V6). The specific V-P relationship for any particular engine output will vary between these two limits. In the ideal case, there is a complete exhaust of the clearanced gases when operating at maximum or minimum engine output (point 9, FIG. 5), this being in contrast to the original Otto and Atkinson processes (point 6, FIG. 1).

Figure 6:
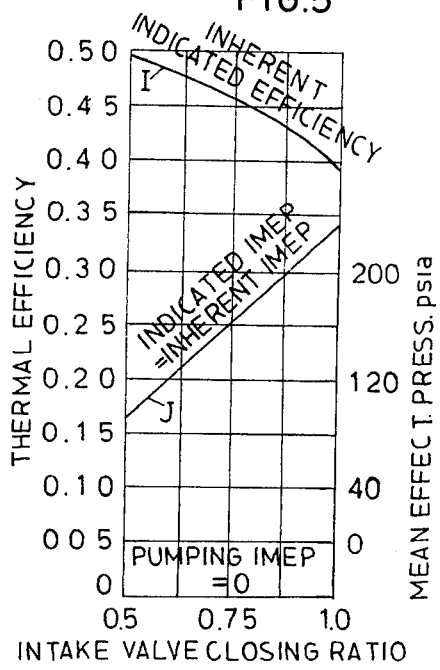
FIG. 6 illustrates how the thermal efficiency varies with variations in the intake-valve closing in the "Otto-Atkinson" engine of the present invention.

For this reason, the volumetric efficiency, and therefore the maximum load, are above the original values for the same compression ratios, as shown in FIG. 6 relative to FIG. 4. One of the important advantages of the present invention is that the thermal efficiency increases, rather than decreases, with a reduction in engine output. Exactly how this is obtained will be described below. FIG. 6 illustrates the results obtained by preliminary computations with respect to the ideal complete exhaust case, wherein it will be seen that the indicated efficiency should increase from about 38% at maximum engine output to about 50% at 0.5 valve closing ratio (curve I), and that the indicated IMEP should decrease from about 230 psia at maximum engine output to about 90 psia at 0.5 valve closing ratio (curve J). In both cases, maximum engine output is taken, for purposes of example, at intake valve closing ratio of 1.0 (i.e. no delay), and intake valve closing ratio of 0.5 (i.e. the valve closes at the half-way point in the compression stroke) indicates minimum engine output.

As will also be explained more fully below, a further advantage of the novel engine illustrated is that in partial loads the expansion and exhaust strokes are larger than the real induction and compression strokes, thereby obtaining a more complete expansion and exhaust than provided by the conventional Otto engine.

The present invention is to be distinguished from the known late intake-valve timing technique used with throttled engines. In this known technique, the intake valve is closed appreciably after dead-bottom-centre (i.e. after the compression stroke has started) in order to attain high output at high engine speed. This technique makes use of the inertia effects of the flowing mixture to ram more charge into the cylinder at high speed by having the intake valve open very widely as the engine crank goes through bottom- dead-centre. This technique, however, does not increase the thermal efficiency of the engine when the original compression ratio remains, even for the fully-opened throttle.

FIG. 7 illustrates an engine constructed in accordance with the foregoing features.

The engine illustrated in FIG. 7 comprises a cylinder 20 having a piston, generally designated 22, movable therein through the conventional four strokes: induction, compression, expansion and exhaust. The intake valve 24 is mounted in the cylinder head 25 having a throttless intake manifold and is controlled by a cam 28 fixed to the cam shaft 30. Valve 24 is normally urged upwardly in valve-closing position by a spring 32 interposed between the cylinder head 25 and the intake valve head 35, and is opened by high point 28a of the cam 28 during each cycle of rotation of the cam.

The foregoing structure, insofar as described above, is more or less conventional in the conventional Otto-cycle automobile engine.

The engine illustrated in FIG. 7 differs from the conventional Otto-cycle engine mainly in the following two respects: (1) it includes a variable timing device to effect a delay in the closing of the intake valve 24 after the start of the compression stroke, this delay being increased when the engine-output control member (e.g. automobile accelerator pedal) is moved to lower the engine output, and being decreased when the engine-output control member is moved to raise the engine output; and (2) it is provided with an arrangement, namely a floating crown on the piston 22, to produce a substantially or approximately constant compression ratio operation notwithstanding variations in the valve closing delay to produce variations in the engine output.

With respect to the first of the above features, the variable timing device for delaying the closing of the intake valve 24 comprises a shiftable member or plate 34 interposed between the valve control cam 28 carried by cam shaft 30, and the head 35 of the intake valve. Shiftable plate 34 is formed with a cam surface including a flat low portion 34a and a gradually increasing higher portion 34b.

Cam plate 34 is coupled to the engine-output control member (e.g. automobile accelerator pedal) via a second shiftable member 36 movable in a slot 26' in a plate 26 on the cylinder head 25. One surface of member 36 is slotted at 36' and engages one end of cam plate 34, and the opposite surface is engaged by a cam 38 fixed to a shaft 40. Shaft 40 is coupled to the engine-output control member, for example the accelerator pedal of an automobile, so that it causes cam 38 to shift members 36 and 34 when the engine output is to be lowered or raised.

FIG. 7 illustrates the position of cam plate 34 to produce a maximum delay in the closing of the intake valve, and therefore a minimum engine output. It will be seen from FIG. 7 that as cam 28 rotates (in the direction of the arrow), the valve will be opened when high point 28a first engages low surface 34a, and will be closed when point 28a leaves high surface 34b.

Now when the accelerator pedal is depressed, cam 38 is rotated (in the direction of the arrow), whereby member 36 and cam plate 34 are moved rightwardly. Normally the continuous rotation of cam plate 28 against plate 34 produces sufficient force to move plate 34 rightwardly, although a spring could be provided urging the plate in this direction. The more plate 34 is moved rightwardly, the earlier in the rotational cycle of cam 28 will its high point 28a leave surface 34b, and therefore the lesser will be the delay in the closing of valve 24.

It will thus be appreciated that valve 24 is always opened at the same instant in the cycle, no matter what the position of plate 34, but its closing will depend on the position of plate 34, the arrangement being such that the more the accelerator pedal is depressed, the more rightwardly will plate 34 be moved, and therefore the earlier will be the closing of the valve. For the ideal case, the valve would be closed at zero delay for maximum power output.

With respect to the constant compression-ratio feature, this is provided by the construction of piston 22, which includes a crown 42, a skirt 44 connected to the piston connecting rod 46 by the piston pin 48, and a spring 50 connected at one end to crown 42 and at the opposite end to piston pin 48 or to the skirt 44 fixed thereto.

It will thus be seen that crown 42 floats with respect to skirt 44, connecting rod 46, and pin 48, so that the exact position of the crown within cylinder 20 at any particular instant will not only depend on the exact position of elements 44, 46, and 48, but also on the inertia force, the gas force, and the spring force (spring 50) acting on the crown at that particular instant. Disc 42' prevents over-floating of the crown.

Figure 8:
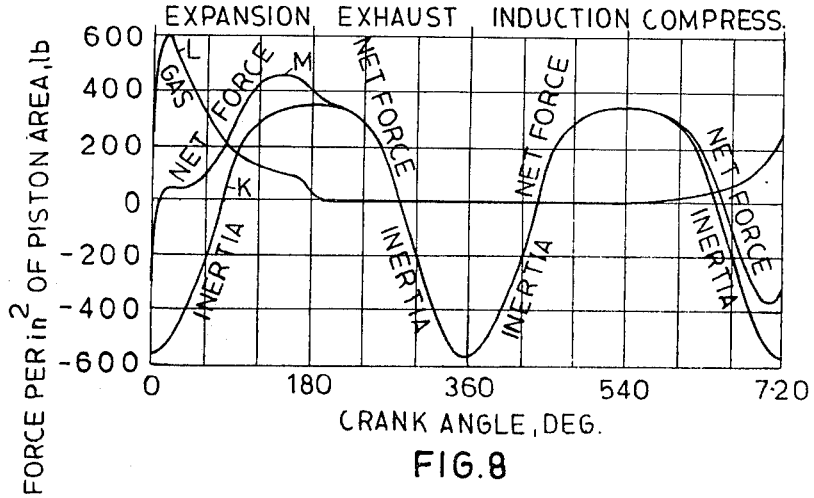
FIGS. 8 and 9 are diagrams helpful in explaining the operaton of the engine of FIG. 7.

FIG. 8 is a force diagram illustrating the inertia force (curve K), the gas force (curve L), and the net force (curve M) of the latter two forces acting on the piston during the four strokes in a conventional Otto-cycle engine. In the "Otto-Atkinson" engine illustrated in FIG. 7, these same forces act on the piston crown 42, but there is the additional force of spring 50 acting on the crown.

Figure 9:
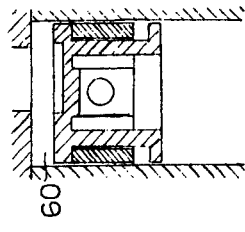
Figure 9:
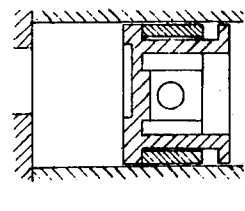
Figure 9:
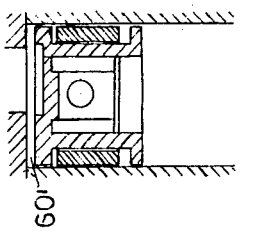
Figure 9:
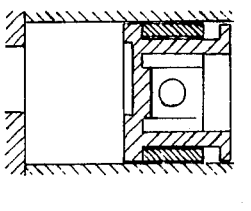
Figure 9:
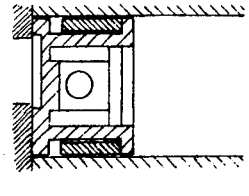
Figure 9:
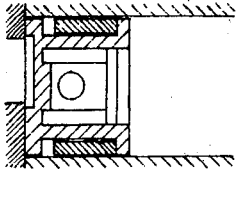
Figure 9:
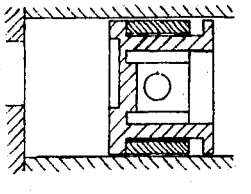
Figure 9:
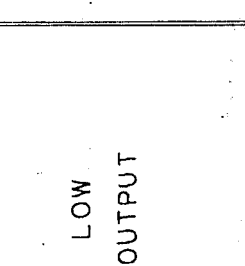

FIG. 9 illustrates the actual displacement of the piston crown 42 during the four strokes of the engine as a result of the foregoing forces acting on it. The actual instantaneous displacement of the crown depends not only on the instantaneous point of the engine cycle, but also on the output of the engine and its rotational speed. FIG. 9 illustrates two conditions, namely the displacement when the engine is operating to produce a high or maximum output, and when the engine is operating to produce a low output, both cases with high rotational speed.

The operation of the "Otto-Atkinson" engine illustrated in FIG. 7 will now be described with particular reference to the displacement diagram of FIG. 9, and also the the force diagram of FIG. 8.

Assuming that the engine is used in an automobile, wherein the engine-output control member is the automobile accelerator pedal, this pedal would be connected to shaft 40 so as to rotate the shaft, and thereby cam 38 fixed to it, in such a direction as to move cam plate 34 rightwardly to increase the engine output.

As described earlier, FIG. 7 illustrates cam plate 34 in such position that high point 28a of cam 28 leaves cam surface 34b of cam plate 34 at the latest time so as to produce the maximum delay in the closing of intake valve 24. This produces the minimum engine output because a substantial quantity of fuel-air mixture will be forece back into the intake manifold at the early part of the compression stroke when the intake valve is still open. Thus, the net quantity of charge in the cylinder at the time of combustion will be substantially decreased.

Now, when the accelerator pedal is moved to raise the engine output, it acts (via shaft 40 to which it is connected, cam 38 and member 36) to shift cam plate 34 rightwardly, whereby high point 28a leaves surface 34b of the cam plate earlier in the cycle. This causes the intake valve 24 to close earlier, thereby decreasing the delay in the closing of the valve after the start of the compression stroke. This discreases the quantity of charge forced out through the intake manifold, thereby producing a greater net quantity of fuel-air mixture inducted into the cylinder, resulting in a higher engine output.

For purposes of example, maximum engine output may be produced when there is zero delay in the closing of the intake valve (i.e. the intake valve closes substantially at bottom-dead-centre), and minimum engine output may be produced when there is a delay of one-half the compression stroke (i.e. the intake valve closes exactly midway of the compression stroke).

FIG. 9 illustrates how a substantially constant compression ratio is attained notwithstanding the variations in the engine output.

As shown in FIG. 9, during both high output operation and low output operation of the engine, the net force acting on piston crown 42 causes the crown to be against the piston skirt 34 at the end of the expansion stroke, to be displaced forwardly of the skirt at the end of the exhaust stroke, and to be against the skirt at the end of the induction stroke. However, as will be explained below, at the end of the compression stroke the crown is against the skirt to provide a large clearance 60 during high output operation, and is displaced forwardly of the skirt to provide a smaller clearance 60' under low output operation.

The crown is forwardly of the skirt at the end of the exhaust stroke because of the large inertia force (curve A, FIG. 8) and the low gas force (curve L, FIG. 8). As shown in FIG. 9, there is substantially no clearance at the end of the of the exhaust stroke, both when the engine is operating to produce a high output and a low output, because the spring and inertia forces acting on the floating crown 42 in one direction are opposed by the low gas force acting on the crown in the opposite direction.

There is, however, a clearance at the end of the compression stroke because the gas force acting on the crown is much higher than in the exhaust stroke. When the engine is operating to produce a high output more mixture will have remained in the cylinder and therefore the gas force will be higher, than when the engine is operating to produce a low output. Accordingly, the clearance at the end of the compression stroke under high output operation will be greater than the clearance at the end of the compression stroke under low output operation. This is shown in FIG. 9, by clearance 60 under high output operation being greater than clearance 60' under low output operation in any amount proportional to the net compression stroke.

Under low engine output conditions the net charge remaining in the cylinder at the start of the actual compression (when the intake closes) will be less than under high engine output conditions. Also the clearance (60') is also decreased, as described above. Accordingly a substantially constant compression ratio and substantially constant compression and combustion pressures are maintained under all engine output conditions. Thus in FIG. 5 P2 equals P6, and P3 equals P7, whereas P1, P5 and P9 are substantially atmospheric, thereby minimising pumping losses.

The basic advantages of the Otto-Atkinson engine illustrated in FIG. 7 over the conventional Otto-cycle engine will be apparent. Thus, it obviates the need of a throttle and therefore eliminates the pumping losses caused by a throttle. Also, it provides a relatively longer expansion stroke while the compression stroke is reduced, and therefore more complete expansion and combustion. Further it provides a longer exhaust stroke and therefore more complete removal of the spent gases, higher volumetric efficiency and higher maximum load. Further, special octane requirements are obviated by the floating piston crown arrangement which maintains a substantially constant compression ratio under all engine output conditions. Thus, the indicated efficiency is increased as engine output decreases.

What is claimed is:

1. An internal combustion engine including a cylinder; a piston movable therein; means including an intake valve for effecting the induction of a charge of fuel air mixture into the cylinder; a control member movable to control the engine output; a variable valve timing device controlling the timing of the intake valve; a coupling between said movable control member and the variable timing device, said coupling varying the timing of the intake valve in response to the movement of the control member and thereby controlling the quantity of the fuel air mixture charge inducted into the cylinder; said piston including a floating crown such that the lowering of the gas pressure acting thereon upon an increase in the delay of closing the intake-valve, permits the crown, by virtue of the inertia force acting thereon, to move further inwardly into the cylinder at the end of the compression stroke than when the said delay is decreased, thereby causing the engine operation to approximate a substantially constant compression ratio operation notwithstanding variations in said valve closing delay and variations in the engine output; said piston further including a skirt coupled to the piston pin; and a spring connected at one end to the piston pin and at the opposite end to the piston crown, said spring acting with said inertia force to move the crown further inwardly into the cylinder at the end of the compression stroke.

2. An internal combustion engine according to claim 1, wherein said variable timing device effects a delay in the closing of the intake valve after the start of the compression stroke, said delay being increased when the control member is moved to lower the engine output and being decreased or eliminated when the control member is moved to raise the engine output.

3. An internal combustion engine according to claim 2, wherein said variable delay device comprises a shiftable member interposed between the valve control cam carried by the cam shaft, and the ahead of the intake-valve, said shiftable member being coupled to the engine output control member and having a cam surface engageable by the valve control cam to vary said delay in the closing of the intake valve in response to the movement of the engine output control member.

4. An internal combustion engine according to any one of claim 1, wherein said engine is included in an automobile, and said engine output control member is the accelerator pedal of the automobile.

* * * * *